(12) United States Patent
Lortz et al.

(10) Patent No.: US 6,438,618 B1
(45) Date of Patent: Aug. 20, 2002

(54) METHOD AND DEVICE FOR FILTERING EVENTS IN AN EVENT NOTIFICATION SERVICE

(75) Inventors: Victor B. Lortz, Beaverton; Jonathan G. Ritchie, Tualatin, both of OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/212,023

(22) Filed: Dec. 16, 1998

(51) Int. Cl.[7] .................................................. G06F 9/44
(52) U.S. Cl. ....................................................... 709/318
(58) Field of Search ........................... 709/318, 310–320

(56) References Cited

U.S. PATENT DOCUMENTS

| | | | | |
|---|---|---|---|---|
| 5,682,532 A | * | 10/1997 | Remington et al. | 709/316 |
| 5,857,190 A | * | 1/1999 | Brown | 707/10 |
| 5,870,605 A | * | 2/1999 | Bracho et al. | 709/318 |
| 5,881,315 A | * | 3/1999 | Cohen | 395/872 |
| 6,021,443 A | * | 2/2000 | Bracho et al. | 709/241 |
| 6,029,092 A | * | 2/2000 | Stein | 700/11 |
| 6,038,542 A | * | 3/2000 | Ruckdashel | 705/9 |

OTHER PUBLICATIONS (no author given) "Events as Operations: IBM OOTIS/PCTE Object Event Notification Service Revised Proposal," OMG TC Document 93–5–6, pp. 1–19, May 1993.*

* cited by examiner

*Primary Examiner*—St. John Courtenay, III
(74) *Attorney, Agent, or Firm*—Kenyon & Kenyon

(57) ABSTRACT

An event notification service in a Component Object Model (COM) system employs a server called an event provider service that operates as a separate layer between an event source and a client called an event subscriber. The notification service also includes event filtering so that an event subscriber only receives events that meet the conditions set by an event filter. A persistent notifier moniker allows an event subscriber client to receive events even if the client is not currently active because the moniker activates the client executing upon receipt of an event.

20 Claims, 5 Drawing Sheets

METHOD AND DEVICE FOR FILTERING EVENTS IN AN EVENT NOTIFICATION SERVICE

BACKGROUND OF THE INVENTION

The present invention pertains to filtering events passed between a server and a client in a computer system.

The Microsoft® Component Object Model (COM) framework is a specification of a set of services that allows a user to create modular, object-oriented, customizable and upgradable, distributed applications using a number of programming languages. *See The Component Object Model Specification, Draft Version* 0.9, Oct. 24, 1995, Microsoft Corporation, Seattle, Wash. and Digital Equipment Corporation, Maynard, Mass. An object is a unique instance of a data structure defined according to a template provided by a class. Each object has its own values for the variables belonging to its class of objects and can respond to the messages defined by its class. COM is an object-oriented framework, as COM objects have identity, state, and behavior and otherwise operate as programming objects in the traditional sense.

The COM specification defines how COM objects should be structured, and how they should operate. COM also includes a set of services, or application programming interfaces (APIs) that are part of a COM library. COM allows modular programming because it provides a communication mechanism to allow components in different modules to communicate. Another feature of COM is that location transparency is provided to applications, i.e., COM provides a communication mechanism that enables components to interact across a network, and for applications to be written without regard for the location of the components.

Events are used in COM frameworks and other systems to signal changes in the state of the system or in the state of a system component. In some systems, an event is a function call provided by an event source (e.g., a server) and implemented by an event subscriber (e.g., a client). A client may be an application executing on a computer that may take some action such as implementing a function based on receiving an event. The event may include (1) a notification that a change has occurred in a component of the system, (2) the new value of the changed variable, and (3) the prior value of the changed variable. An event may be generated, for example, when a home device is connected to a computer control system, or when a property of the home device has changed. This generates an event to indicate the connection or change and to cause the appropriate client (e.g., an application executing on a computer) to respond accordingly.

In current COM systems, events are typically passed from a server to all clients connected to that server regardless of the nature of each client and the nature of the event. Because events may initiate out-of-process calls, which require use of the operating system, and therefore consume a large amount of computer resources, it is desirable to have each client receive no more events than necessary. Furthermore, because some clients will not need to become active unless they receive an event, system resources are wasted when a client receives a particular event that it does not need. It is desirable, therefore, to provide a system for filtering events received by clients so that only events that will initiate a particular action by a particular client will be passed to that client.

Basic filtering of messages in computer systems with client and server software applications is known in the art. Certain factory automation systems and Internet "push" technologies (where a browser acts as a client desiring to be notified of changes in the server) employ event filtering. These systems include subscribing to events and publishing criteria by which those events are filtered. However, the standard COM mechanisms for event notification provide either no support for event filtering (for IConnectionPoint events) or very limited and non-extensible support (for IDataObject events).

SUMMARY OF THE INVENTION

In one embodiment of the present invention, an event notification system is constructed in a Component Object Model framework, to pass an event from an event source to an event subscriber. The event notification system comprises an event filter to represent a condition under which the event subscriber is to receive the event, and an event provider service for comparing the event to the event filter. The event source passes the event to the event provider service and the event provider service passes the event to the event subscriber if the condition of the event filter is met.

DETAILED DESCRIPTION

A method and device are provided for implementing a filtering function in, for example, a system developed and supported with the standard Microsoft® Component Object Model (COM) framework. A COM system may be used, for example, to enable applications to discover and control home devices in a home network.

Figure 1:
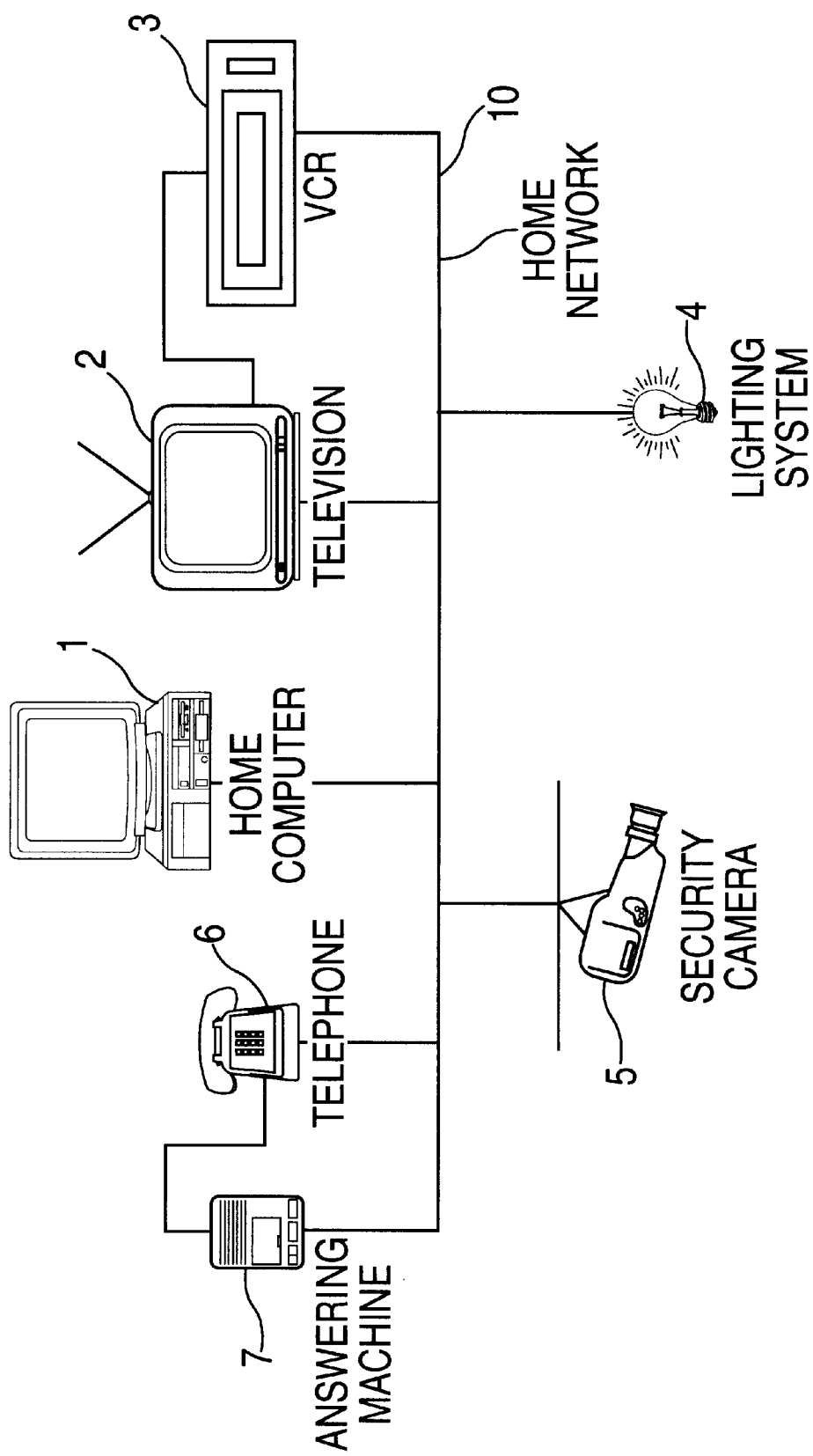
FIG. 1 is a diagram of a home network with home devices connected to the network.

FIG. 1 shows a diagram of a home network, which is an example of the type of system in which a COM event notification service may be employed. A home network is a type of network that is used primarily in residences to connect various home devices so that they may be managed by a single or multiple computers. Devices connected to a home network are designed or adapted to be controllable by a computer, usually a desktop or laptop personal computer. The devices may also be controlled manually, without using the computer.

A home computer 1 is connected to various home devices across a home network 10. The home network 10 may comprise, for example, a power line or radio frequency (RF) network, or a network described by the IEEE-1394 standard for connecting digital entertainment devices (e.g., digital television, digital VCR). (See Institute of Electrical and Electronics Engineers, Inc. (IEEE) Std. 1394, "IEEE Standard for a High Performance Serial Bus" (IEEE Std. 1394-1995, v. 8.0, 1996). Certain networked devices may also be controlled by a computer through infrared-based remote control.

Home devices shown in FIG. 1 that may be connected to such a system include, for example, a television 2, a video cassette recorder (VCR) 3, a lighting system 4, a security camera 5, a telephone 6, and a telephone answering machine 7. Other types of devices, not shown in FIG. 1, that may be connected to the system include security alarms, door locks, home stereo systems, thermostats, heaters, air conditioners, and other devices. Software applications executing on the home computer 1 monitor and control the devices connected to the network 10. Hardware devices may also be used for this purpose. In monitoring a device, an application must be notified of certain changes in the properties of the device. These changes may originate from the environment (e.g., a temperature change), from another application or from a user manually changing the property (e.g., pressing the "play" button on the (VCR) 3, rather than selecting the "play" command through the computer 1). In controlling a device, a software application changes the properties of the device by sending command messages across the network.

Figure 2:
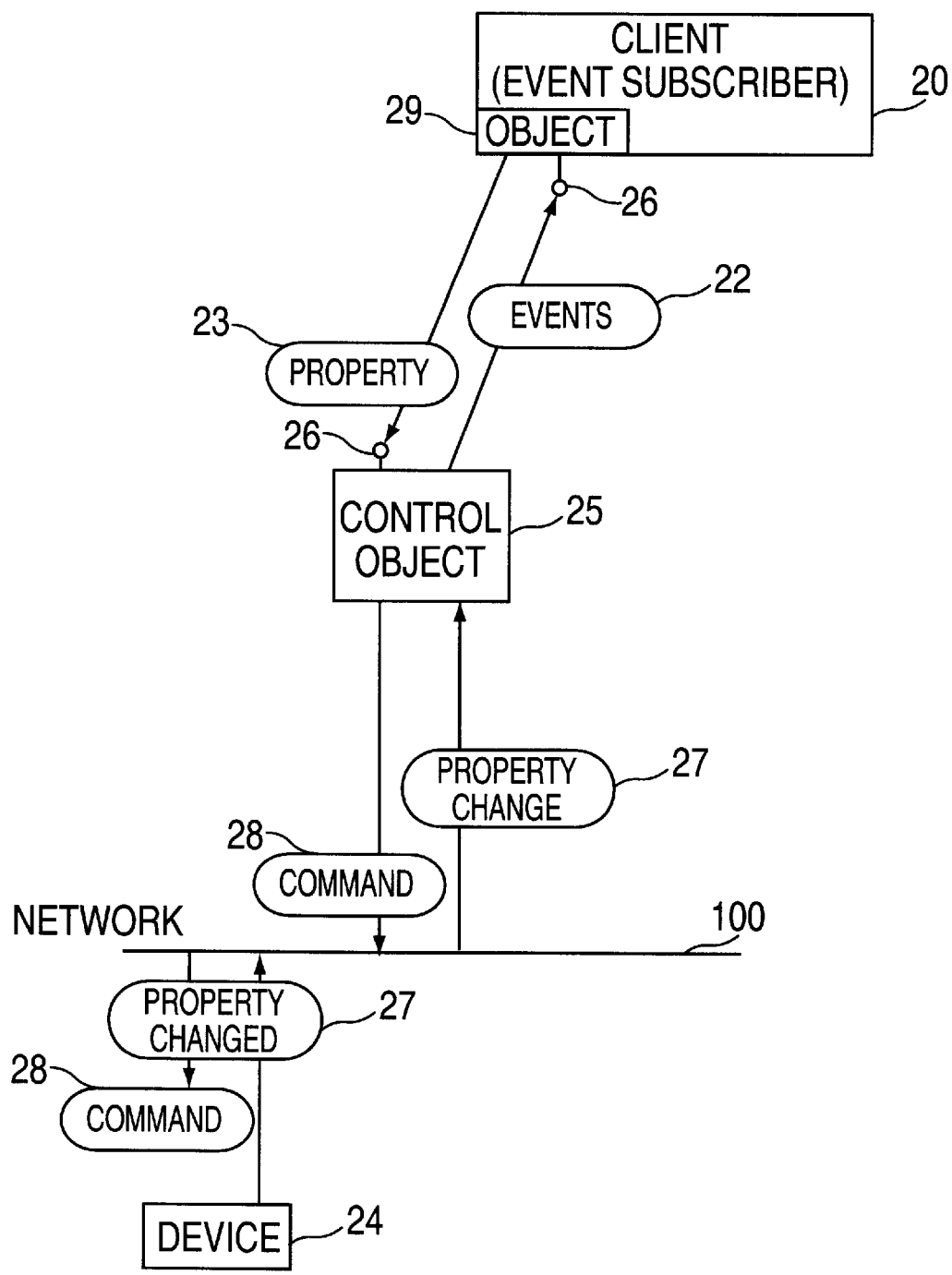
FIG. 2 is a block diagram of an exemplary event notification system according to the prior art.

FIG. 2 shows an example of a network including a framework for event notification in a COM IConnectionPoints system according to the prior art. In this network, no filtering system is present and no separate event provider service is operating. A device 24 is connected through a network 10 to a control object 25 that controls the device and communicates with a client 20. A control object is a software object that communicates with a device, and interprets messages (e.g., control messages) for the device into a form the device can understand, and which interprets messages from the device (e.g., property change messages) into a form a client (e.g., a software application) can understand. The device 24 may comprise a home appliance, a computer hardware component, or any physical or software object capable of receiving commands and signaling property changes. In the example of a home network system, the device 24 may comprise, for example, any of the devices shown in FIG. 1, or any other device compatible with a home network 10 or any other type of computer network. Although a single device 24, control object 25, and client 20 are shown, it is to be understood that multiple devices, control objects, and clients may be provided. The control object 25 and the client 20 may reside on the home computer 1 that manages the home network. In FIG. 2, the device 24 is shown connected to a network 100 that may comprise, for example, a home network, or any other type of computer network.

A Client 20, shown in FIG. 2, may comprise, for example, a software application capable of executing on the Microsoft Windows® 95 operating system. In the context of a home device management system, this application could be, for example, a software program for managing home audio/visual devices. Such a program could be designed to allow a user to control the functions of all the user's home audio/visual devices through one interface (e.g., a personal computer). For example, the client 20 application may allow the user to control power on/off, volume, and channel selections of the stereo systems, televisions, VCR's, and cable boxes in the user's house.

If a user changes any of the parameters of the devices manually (that is, without using the client application) then the client application is notified of the change with an event notification. This allows the client application to monitor changes made and to keep updated on the status of the devices. For example, if a user changes the channel on a television by manually pressing the buttons on the television, then the television will notify the client application of the old and new channel values through an event notification. In this way, the client application remains updated on the status of the television so that if the application is next used to change the channel, it will know the correct prior value, and therefore will know how to increment the channel selection to the new value.

The client may also perform any type of function based on the event received. This function may be performed within the client (e.g., updating the client's graphical user interface); it may be performed on the device that originated the event (e.g., changing a property of the device); or it may be performed on a different device or software application (e.g., shutting down a device in response to an alarm).

Each device 24 has a corresponding control object 25. The control object 25 is a software object that represents the device 24 to the client 20. The device 24, through the control object 25, exposes its device controls to the client 20 by allowing the client 20 to send property commands 23 to change the properties of the device 24. The control object 25 receives property commands 23 from the client 20 and changes them into control commands 28 that the device 24 can understand. The control object 25 passes the control commands 28 to its device 24 to control and change properties of the device 24. The control object 25 converts the property changed message 27 into an event 22 that a client 20 can understand and implement. The client 20 has an object 29 active for each control object to which the client 20 is connected. These client objects 29 communicate with the control objects 25 for the client 20. The device 24, through the control object 25, uses events 22 to signal state or property changes to the client 20. The device 24 sends property changed messages 27 to the control object 25 in order to signal changes that have occurred in properties of the device 24.

Each control object 25 represents a device 24. When the client 20 is executed, it queries each control object 25 to determine whether the control object 25 supports an event 22 the client 20 is interested in. If the control object 25 supports the event 22, the client 20 requests a connection point 26 to the control object 25. In order for this connection to be completed, the client 20 must have an object 29 that corresponds to the control object 25. Once the client 20 receives the connection point 26 back from the control object, the client 20 passes its own object 29 to the connection point 26. This is a relatively inefficient process involving a relatively high number of round-trip calls. Furthermore, once the client 20 has implemented a connection point 26 to a control object 25, the client 20 receives all events signaled by the control object 25. Even though the client 20 may only be interested in certain events 22, there is no provision in the existing COM framework for filtering events so that a client only receives events it is interested in. For example, a client 20 application that displays a volume control will connect to a television control object 25 because that control object supports volume change events 22. The client 20 will then be required to receive and process all events 22 (e.g., channel change events, picture quality events) even though the client 20 may only interested in certain volume change events 22.

Events originate when a device 24 signals a property changed message 27 to its control object 25. Changes in the status of a device or in variables managed by the device will trigger these property changed messages. For example, when a user changes the volume of a television, changes the channel, or turns the power on, the television signals the change as a property changed message 27 to the control object 25 that controls the television. The control object 25 then generates an event 22 (e.g., a volume-changed event) that is passed to the object 29 of the client 20.

The control object 25 operates as a server from the point of view of the client 20. An event 22 is a function call on an interface specified by an event source (e.g., a server) but implemented by an event subscriber (e.g., a client). The function is essentially a callback from the event source to the event subscriber that signals the occurrence of a particular event in the event source. The name of the function and the types of parameters passed to the function are specified by the event source, but the function itself is implemented by the event subscriber (e.g., the client). For example, a television volume control change event 22 may specify the old volume and the new volume. The client 20 application receives the television volume event 22 through its television object 29, and then, for example, will change a display on a graphical user interface (GUI) representing the television volume level.

After the control object 25 signals an event 22 to the client 20, the client 20 receives the event as a callback function call, as specified by the event definition. After executing the function specified by the event 22, the client 20 may modify a property on the control object 25 associated with a device 24 (e.g., change the status of the device) with a property command 23. The control object 25 for a device 24 implements the set of properties defined for that device type. The control object 25 converts the property command 23 into a command 20 that is sent across the network 100 to the device 24 to which it applies. As clients 20 manipulate a device's properties, the control object 25 responds by sending commands to the device 24. For example, a client 20 application may manage the channels that a child is allowed to watch on a television. Upon receipt of an event 22 indicating that a channel has been changed to a forbidden channel, the client 20 may send a property command 23 to the control object 25 changing the television channel (e.g., back to the previous channel). The control object 25 then converts the property command 23 to a control command 28 (to change the channel back), and sends the control command 28 to the television via the network 100. The television then implements the control command 28 and changes the channel back to the original channel.

In the example of a notification service 26 shown in FIG. 2, no filter is employed between the client 20 and the control object 25. When a client 20 connects to a control object 25, it subscribes to a particular type of event that it is interested in (e.g., television channel change events). The client 20 then receives notification of each property change (e.g., a channel change) signaled by the device 24 to the control object 25 when the control object 25 formulates an event 22 and sends it to the client 20. Even if a client 20 is only interested in particular events 22 of the type for which it is subscribed, it will receive all events 22 of that type. For example, a software application designed to prevent children from watching certain television channels may only be interested in events that indicate a change to one of the forbidden channels. Under the system shown in FIG. 2, however, the application (a client) would receive all channel change events from the control object (a server) because filtering is not possible. Because the signaling of an event 22 from the control object 25 to the client 20 may involve an out-of-process call, which consumes a large amount of computer resources, it is desirable to provide a system to filter events 22 so that a client 20 receives only events that are relevant to its functionality.

Another limitation of the example shown in FIG. 2 is the direct connection between control objects 25 and clients 20. This direct connection creates initialization order dependency by requiring that a control object 25 must be currently executing before a client 20 can subscribe to events 22 of that control object 25. For example, if a client 20 is interested in all volume control change events, when the client starts executing it will query each control object 25 to determine if it supports volume control events. The client may discover, for example, control objects for a home stereo and a home answering machine because those control objects 25 are currently executing and show that they support volume control events. The control object 25 for the television, however may not be executing at this time, and the client may not discover the television. If a television is later connected to the network 100 or otherwise activated (e.g., by being turned on), the client 20 may not discover this, and may not receive volume control changes sent out by the television because the client 20 does not know to establish a connection.

In addition, the client 20 must know about and subscribe to each control object 25 for each device 24 from which relevant events 22 may be signaled. There is no mechanism for the client 20 to be notified of events 22 that may be relevant, but are generated by a control object of which the client 20 is ignorant. In the example of a home control network, a client 20 may be interested in all events in which a volume control is changed. The client 20 would have to connect to all control objects 25 for devices 24 that indicate volume control changes. For example, a client 20 subscribed only to control objects 25 for a stereo system and a television would not be able to receive the volume control change events 22 of a telephone answering machine, even if the client was interested in all volume control change events 22. Furthermore, because connections are strictly client-initiated in the COM ConnectionPoint system, there is no way for a newly-connected or newly-created control object 25 to advertise its availability to clients 20. Therefore, a client 20 that is interested in certain events 22 (e.g., volume control changes) may not be aware that a new device 24 that signals such events 22 (e.g., an answering machine) has been connected to the network, and will not, therefore receive event 22 notification of property changes 27 in that device 24.

The performance of the control object 25 may also be impeded by the direct connection because in that arrangement the control object 25 waits for a response each time it signals an event 22 to a client 20. If the client 20 takes a long time to respond to the event 22, the control object 25 may not be able to perform any functions during that time. It is therefore desirable to add an event provider service as a layer between the control objects 25 and the clients 20 that may act as a server with respect to the client 20.

Figure 3:
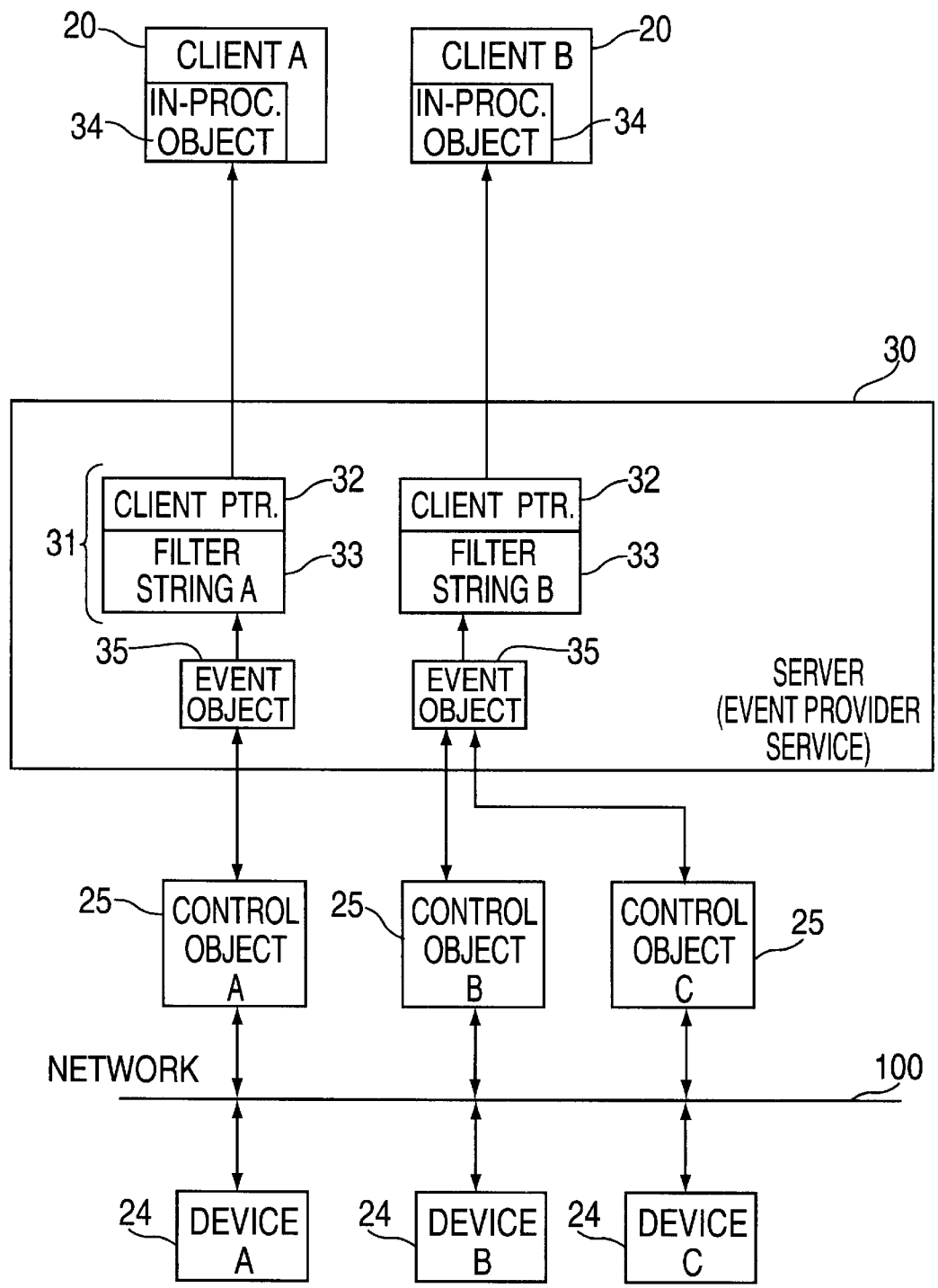
FIG. 3 is a block diagram of an exemplary event notification system according to an embodiment of the present invention employing a separate event notification service and an event filtering system.

FIG. 3 shows an exemplary embodiment of the present invention employing an event provider service (e.g., a server 30) and event filtering (via event filters 31). The event provider service shown as server 30 is in communication with the control objects 25. The server 30, by operating as an independent process between the control objects 25 and the clients 20, allows connections by the control objects 25 and the clients 20 to be made independent of each other. This means that, for example, a client 20 can subscribe to events 22 from a control object 25, even if the control object 25 is not executing at that time (i.e., the problem of initialization order dependency is relieved).

Rather than subscribing directly to each control object 25, a client 20 can register an interest in events with the server 30, by subscribing to an event object 35 of the server 30 and specifying the types of events 22 the client 20 is interested in (through the event filters 31, described below). The control objects 25 connect to the server 30 independently of the clients 20. Each control object 25 signals events to the server 30 rather than directly to the clients 20, so the control object 25 receives an immediate "event received" response from the server 30 rather than having to wait for the client 20 to process the event 22 and respond that the event was processed. The server 30 then passes all appropriate events 22 to the client 20. The client 20, therefore, does not have to wait until a control object 25 connects to the server 30 for the client 20 to subscribe to a control object's 25 events 22.

Figure 4:
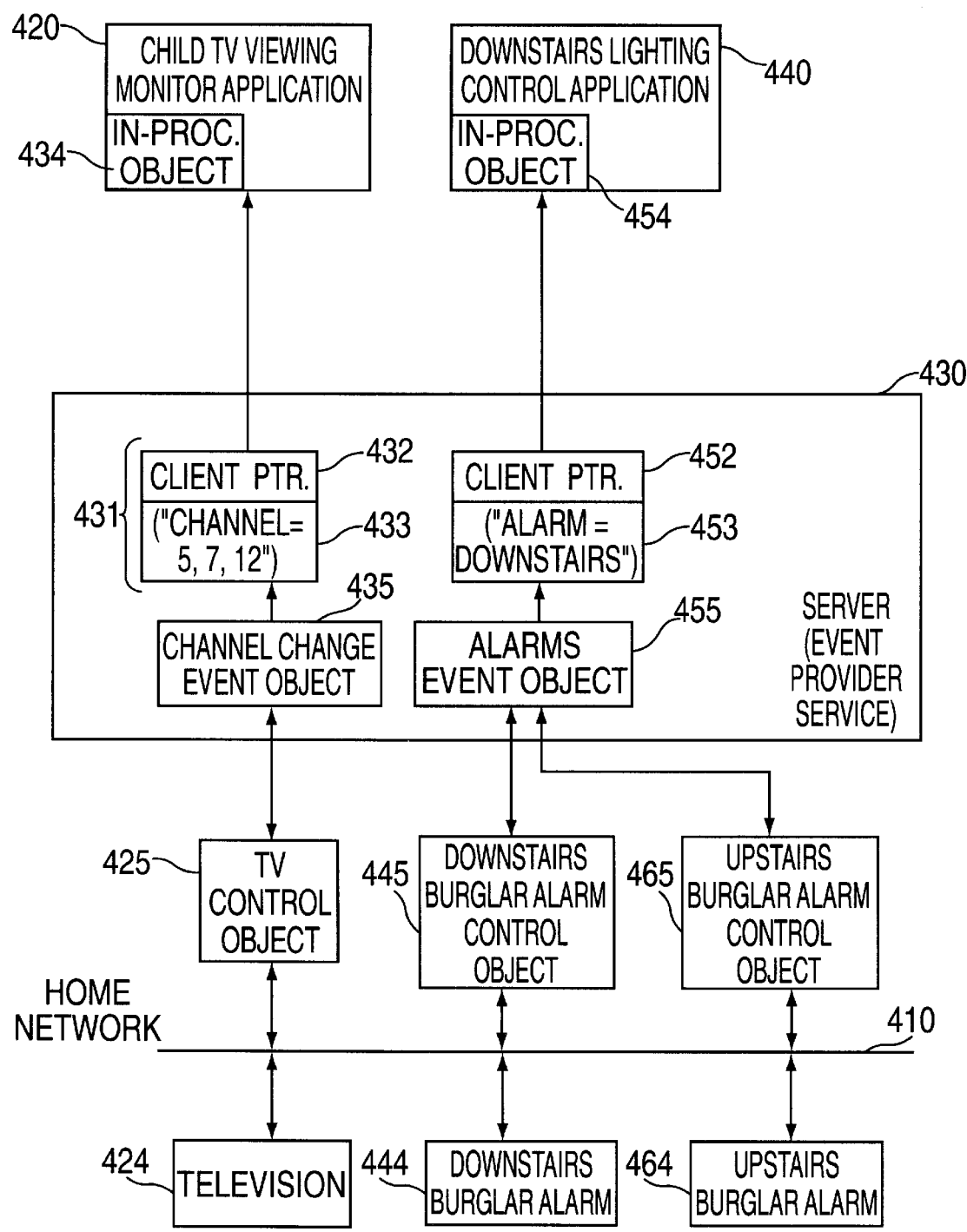
FIG. 4 is a block diagram of an exemplary event notification system according to an embodiment of the present invention adapted for use in a home network.

FIG. 4 shows an example of an embodiment of the invention shown in FIG. 3, adapted for use in a home network. When downstairs burglar alarm 445 is not connected to the network 410, the downstairs burglar alarm control object 445 will not be active. An application 440 that controls the downstairs lighting system may turn the downstairs lights on or off in response to certain alarms (e.g., a downstairs burglar alarm, a downstairs bathroom water over-flow alarm, a downstairs fire alarm). The downstairs light application 440, therefore subscribes to the server 430 and registers an interest in all alarms by subscribing to the alarms event object 455. Since the downstairs light application 440 is only interested in downstairs alarms, it also implements a filter specifying its limited interest. When the downstairs burglar alarm 444 is connected to the network, the downstairs burglar alarm control object 445 starts executing, connects to the server 430, and passes downstairs burglar alarm events to the server 430, which are received by the alarms event object 455. These alarm events are then sent by the alarms event object 455 to the downstairs light client 440 because that client has registered an interest in alarm events by connecting to the alarms event object 455. Because the server 430 is an independent process, the downstairs light application 440 can receive alarm events from the alarms event object 455 even though the downstairs burglar alarm control object 445 began executing after the downstairs light client 440 subscribed to the server 430.

Referring again to FIG. 3, the client 20 may wish to receive events from a specific control object 25. In that case, the client 20 will connect to an event object 35 on the server 30 that corresponds to the single control object 25 and supports the type of event the client 20 is interested in. To receive events from multiple control objects 25, the client 20 may connect to multiple event objects 35, each supporting the type of event the client 20 is interested in, and each corresponding to a control object 25. Alternatively, the client 20 may connect to an event object 35 on the server 30 that supports the type of event the client is interested in, and which is connected to multiple control objects 25. In this case, the multiple control objects 25 signal events to the event object 35, and the event object 35 passes the events to the client 20. In this way, the client 20 will receive all the events of the type supported by the event object 35, regardless of which device 24 originated the event, or even whether the client 20 is aware of the device 24. Furthermore, multiple clients 20 may subscribe to a single event object 35 so that each client 20 receives the events supported by the event object 35.

For example, a client 20 interested in volume change events need not be aware of each control object 25 (e.g., an answering machine control object) that supports volume change events, because direct connection with that control object is not required. The server 30, therefore, provides a rendezvous point for the client's 20 registered interest in events and the control object's 25 operation as a source of events. Therefore, by segregating the event provider service as a separate process (e.g., server 30), some of the limitations of the system shown in FIG. 2 are overcome.

Also shown in FIG. 3 are the event filters 31 used to control the events 22 that are sent to the clients 20. The event filters 31 insure that only events that a client 20 is interested in are sent to the client 20. Each event filter 31 includes, for example, a filter string 33 and a pointer 32 to the client. The client 20 connects to the server 30 through an in-process object 34 that may execute on the client 20. When a client 20 connects to an event provider service (e.g., server 30), the client 20 receives a token associated with that connection. An in-process object 34 of the client 20 then calls a function to add event filters 31. The in-process object 34 can retain this subscription to the server 30 (through the event filter 31) or the in-process object 34 may direct the subscription to another object (not shown).

For example, a client 20 application interested in certain television channel change events calls an in-process object 34 to connect to the server 30, through a filter 31, specifying an interest in these events. The filter 31 includes a pointer 32 back to the client 20 and a filter string 33. The pointer 32 may be a direct pointer to a COM interface or a logical pointer expressed as a moniker string corresponding to a callback object in the client 20. The filter string 33 comprises a string of characters that specifies that the client 20 is interested in certain television channel change events. When the event object 35 receives an event from a control object 25, the event object 35 compares the event to the filter string 33 of the filter 31. If the event matches the parameters set by the filter string, the event object 35 forwards the event to the client 20. Otherwise, the event object 35 moves to the next filter 31 (if another client 20 is subscribed) to determine if the event matches the filter string 33 of that filter 31.

The add event filter function call includes parameters that are included in the filter string 33. These parameters specify which events the client 20 is interested in receiving. The string may specify that events are to be forwarded only if the event is signaling within a certain range of values; the string may specify that an event is to be forwarded only if certain outside conditions are met, or the string may specify that an event is only to be forwarded if it originates from one of a certain group of objects. The parameters of the filter string 33 can be used, for example, to specify a conditional filter 31 that will only be satisfied if variables of the event 22 meet certain criteria. For example, the parameters may specify that the client 20 is to receive a temperature change event only if the temperature changes by more than 5 degrees. Because the event may contain a prior value as well as a new value, as described above, the event provider service will be able to determine if this condition is met. When the server 30 receives an event 22, the server iterates over its client connections (e.g., each filter represents a client connection). The server 30 compares the event 22 to the filter string 33 of each client 20. If there is a match to the criteria specified by the filter, the server 30 sends the event 22 to the client 20 via the client pointer 32. If the filter criteria specifies that the client 20 is not interested in the event 22, the server 30 moves to the next filter 31.

The example of FIG. 4 will illustrate the embodiment of the invention shown in FIG. 3. Client 420, an application that prevents a child from tuning a television to certain channels, has provided a filter specifying that it is only interested in events that indicate a television channel change to channel 5, 7, or 12. Client 440, a downstairs lighting control application, has provided a filter specifying that it is interested in all events that indicate that an alarm has been set off downstairs. If the television 424 detects that its channel has been changed, it signals a property changed message to its control object 425. The control object 425 creates an event indicating that the channel has changed, indicating the new channel, and indicating the prior channel. The channel changed event is passed to the channel change event object 435 on the event provider service server 430 by the television control object 425, and the server 430 returns an "event received" message to the control object 425.

The channel change event object 435 then compares the event to filter string 433. If the event indicates a channel change to channel 5, 7, or 12, the event object 435 forwards the event to the in-process object 434 of the client 420. If the event indicates a channel change to a channel not listed by the filter string 433, the channel change event object 435 compares the event to the filter of the next client connection (if another client is connected). After all the connections to the event object 435 have been parsed, the server drops the event and awaits notification of the next event.

One alternative example of a framework for implementing event filters is to employ the lightweight directory access protocol (LDAP) (developed by the Internet Engineering Task Force (IETF)) to create the filter specification. An LDAP directory entry is a collection of attributes with a name that refers to the entry unambiguously. Each of the entry's attributes has a type and one or more values. The types are typically mnemonic strings (e.g., "cn" for common name, or "mail" for e-mail address). The values depend on the type. The LDAP filter specification syntax includes boolean and relational operators that can be combined into very general and powerful filters. Furthermore, use of the LDAP protocol allows for leveraging the search capabilities of an LDAP-compliant directory service to perform event filtering. The filter evaluation function of an event provider service server 30 may be exposed so that clients 20 can pass in a filter specification and a directory object to the server 30. In the case of LDAP filters, the server 30 parses the filter and evaluates it by querying the event for attributes mentioned in the filter. The result of the filter evaluation is returned to the client 20.

Another alternative example of a framework for implementing event filters is to employ a query language, such as a language used for relational databases. An example of these types of languages is the Structured Query Language (SQL), a language which provides a user interface to relational database management systems, developed by IBM, and currently an ISO and ANSI standard. See ANSI X3.135-1992 (R1998): "Information Systems Database Language SQL" (includes ANSI X3.168-1989). Query languages are used to implement queries that are applied to sets of data to extract a sub-set of the data that matches the query conditions. In an embodiment of the present invention using SQL, or some other query language, events are viewed and operated on as data values in columns of a relational table. The events, however, are also a stream of values input over time, and they are subject to the query (filter) as they are received, rather than searched through as a static data set.

Clients 20 that do not implement an event filter 31 (either because they were created in a prior system that did not employ event filtering, or because they were not created to implement event filtering for some other reason) will default to receiving all events. To accommodate COM Connection-Point clients 20 that are unaware of event filtering ("legacy clients") and event notification service, a control object 25 simply implements an event object 35 by passing an event provider service's event object 35 to the client 20 as a ConnectionPoint object. When legacy clients 20 subscribe to the event object 35, they will receive all unfiltered events generated by the control object 25 (this matches the semantics expected by those clients 20). The control object 25 itself does not need to do any additional work to accommodate these legacy clients 20. The event provider service decides whether filtering is needed and performs the event notification calls for all types of application clients 20.

Figure 5:
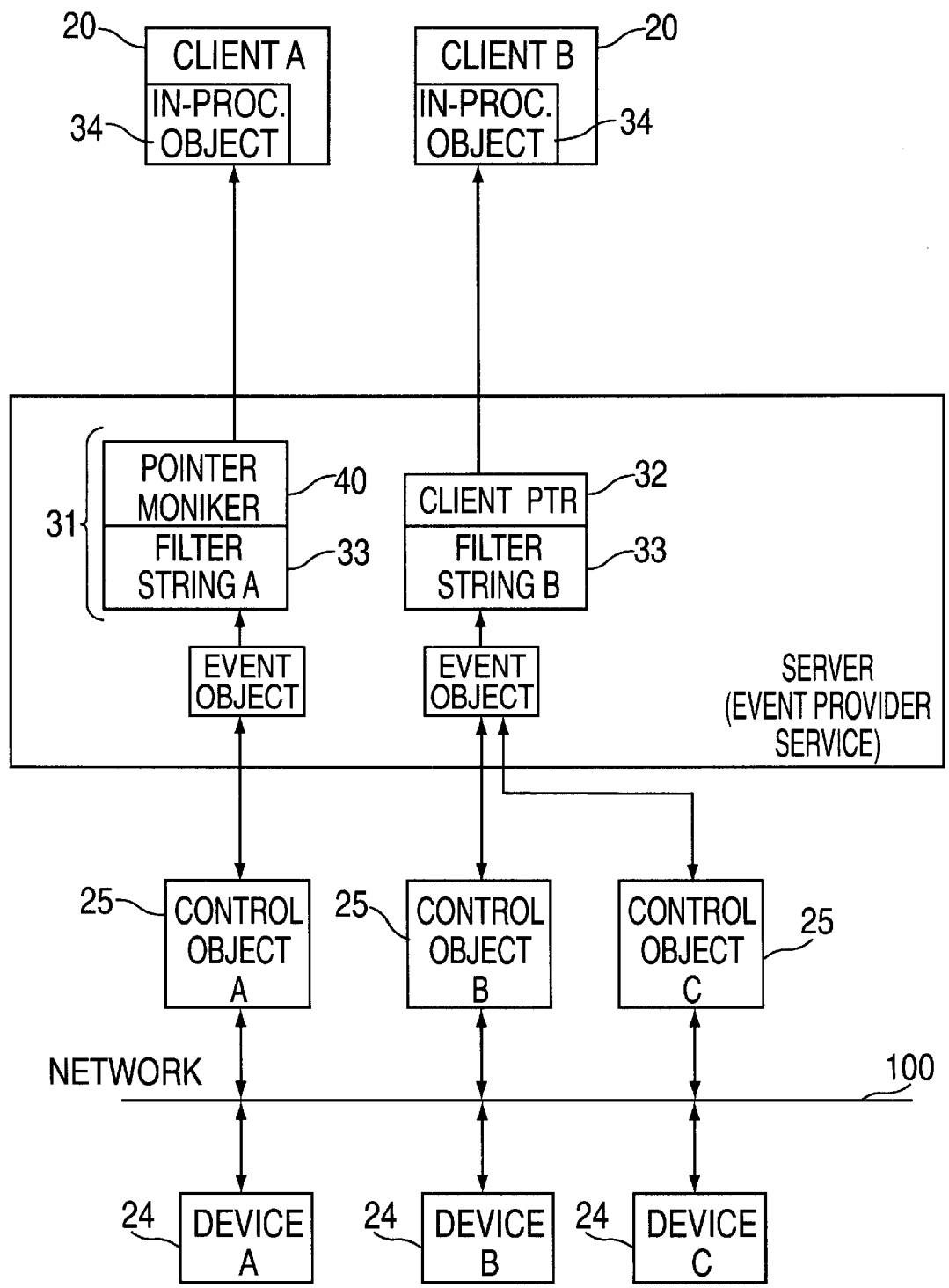
FIG. 5 is a block diagram of an exemplary event notification system according to an embodiment of the present invention employing a separate event notification service, an event filtering system, and a persistent notifier moniker.

FIG. 5 shows an embodiment of the present invention in which the client pointer includes a moniker 50, operating as a persistent notifier. A persistent notifier moniker 50 is a type of pointer that allows a client that is not currently active to receive events. The moniker 50 includes a persistent client reference and exposes the same interface as the client 20 would to the filter 31. The moniker 50 is capable of activating the client so that the client can receive events. Upon receipt of an event, a moniker 50 activates the client 20 through a moniker binding operation, if that client has exited (is not currently active), and then passes the event to the client 20. After each event notification, the filter or event server may release the client's interface, enabling the client to exit, if desired. If the client 20 is already executing, the moniker 40 simply passes the event to the client 20.

Although an embodiment is specifically illustrated and described herein, it will be appreciated that modifications and variations of the present invention are covered by the above teachings and within the purview of the appended claims without departing from the spirit and intended scope of the invention. It is understood, for example, that although the example of a home network is used throughout for illustration, the present invention may be implemented in any COM framework in which event notification is desired.

What is claimed is:

1. An event notification system, constructed in a Component Object Model framework, to pass an event from an event source to an event subscriber, comprising:

an event filter to represent a condition under which the event subscriber is to receive the event and;

an event provider service for comparing the event to the event filter, wherein:

the event source passes the event to the event provider service and;

the event provider service passes the event to the event subscriber only if the condition of the event filter is met.

2. The event notification system of claim 1, wherein:

the event source is in communication with a device.

3. The event notification system of claim 2, wherein:

the event source communicates with the device across a network.

4. The event notification system of claim 3, wherein:

the network comprises a home network including:

at least one computer;

at least one home device adapted to be controlled by a computer.

5. The event notification system of claim 1, wherein:

the event subscriber performs a function based on the event.

6. The event notification system of claim 5 wherein:

the function based on the event includes changing a property of a device.

7. The event notification system of claim 1, wherein:

the filter includes a filter string.

8. The event notification system of claim 1, wherein:

the filter is expressed in a query language.

9. The event notification system of claim 1, wherein:

a syntax of the filter is compatible with a lightweight directory access protocol.

10. The event notification system of claim 1, wherein:

the event source comprises an object for passing a command to a device to control a property of the device.

11. The event notification system of claim 10, wherein:

the event source further comprises an object for receiving a message from the device, converting the message into the event, and forwarding the event to the event provider service.

12. The event notification system of claim 1, further comprising a moniker to activate the client if the client is not currently active when the client is to receive an event.

13. The event notification system of claim 1, wherein:

the event filter is provided by the event subscriber to the event provider service.

14. The event notification system of claim 1, wherein:

the event provider service includes an event object.

15. The event notification system of claim 1, further comprising a legacy client as an event subscriber, wherein:

the event provider service passes all events received from the event source to the legacy client.

16. A method for passing an event notification from an event source to an event subscriber implemented in a Component Object Model system comprising:

subscribing the event subscriber to an event provider service;

communicating a subscription filter condition to the event provider service;

determining when an event is signaled from an event source;

comparing the event to the subscription filter condition to determine whether the event should be passed to the event subscriber;

passing the event to the event subscriber only when the condition of the event filter is met.

17. The method of claim 15 wherein:

the event subscriber performs a function based on the event.

18. The method of claim 15 wherein:

the event source comprises a control object.

19. The method of claim 15 further comprising the step of:

activating the client if the client is not currently active when the client is to receive an event.

20. A storage medium including a set of instructions, said set of instructions capable of being executed by a processor to implement a method for event notification of an event subscriber by an event source implemented in a Component Object Model system, the instructions to:

subscribe the event subscriber to an event provider service;

communicate a subscription filter condition to the event provider service;

determine that an event should be signaled from an event source;

compare the event to the subscription filter condition to determine whether the event should be passed to the event subscriber;

pass the event to the event subscriber, only if the condition of the event filter is met.

* * * * *